No. 811,165. PATENTED JAN. 30, 1906.
S. M. NELSON & N. NIELSEN.
SHOCK LOADER.
APPLICATION FILED APR. 27, 1905.

3 SHEETS—SHEET 2.

WITNESSES
F. C. Tanner.
C. Mamamam

INVENTORS
SOREN M. NELSON
NIELS NIELSEN
BY Paul Stool
THEIR ATTORNEYS.

No. 811,165. PATENTED JAN. 30, 1906.
S. M. NELSON & N. NIELSEN.
SHOCK LOADER.
APPLICATION FILED APR. 27, 1905.

3 SHEETS—SHEET 3.

WITNESSES

INVENTORS
SOREN M. NELSON
NIELS NIELSEN
BY Paul & Paul
THEIR ATTORNEYS.

UNITED STATES PATENT OFFICE.

SOREN M. NELSON AND NIELS NIELSEN, OF MARIETTA, MINNESOTA.

SHOCK-LOADER.

No. 811,165.      Specification of Letters Patent.      Patented Jan. 30, 1906.

Application filed April 27, 1905. Serial No. 257,570.

*To all whom it may concern:*

Be it known that we, SOREN M. NELSON and NIELS NIELSEN, of Marietta, Lac qui Parle county, Minnesota, have invented certain new and useful Improvements in Shock-Loaders, of which the following is a specification.

The object of our invention is to provide a machine for gathering up shocks of grain or corn in the fields and delivering them to a wagon.

A further object is to provide a machine of simple construction and one that can be easily operated and having a large capacity.

The invention consists generally in various constructions and combinations, all as hereinafter described, and particularly pointed out in the claims.

Figure 1:
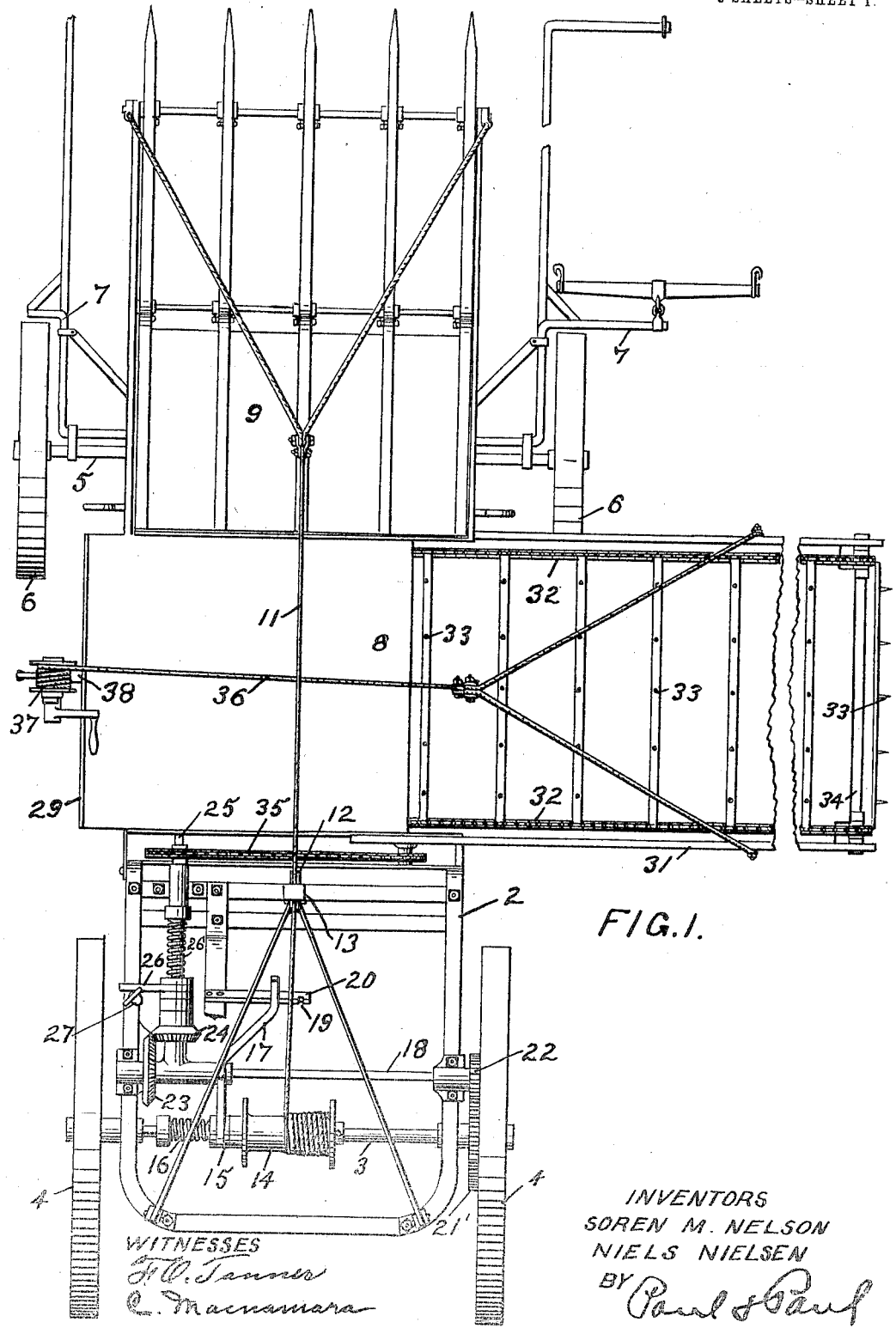
Figure 2:
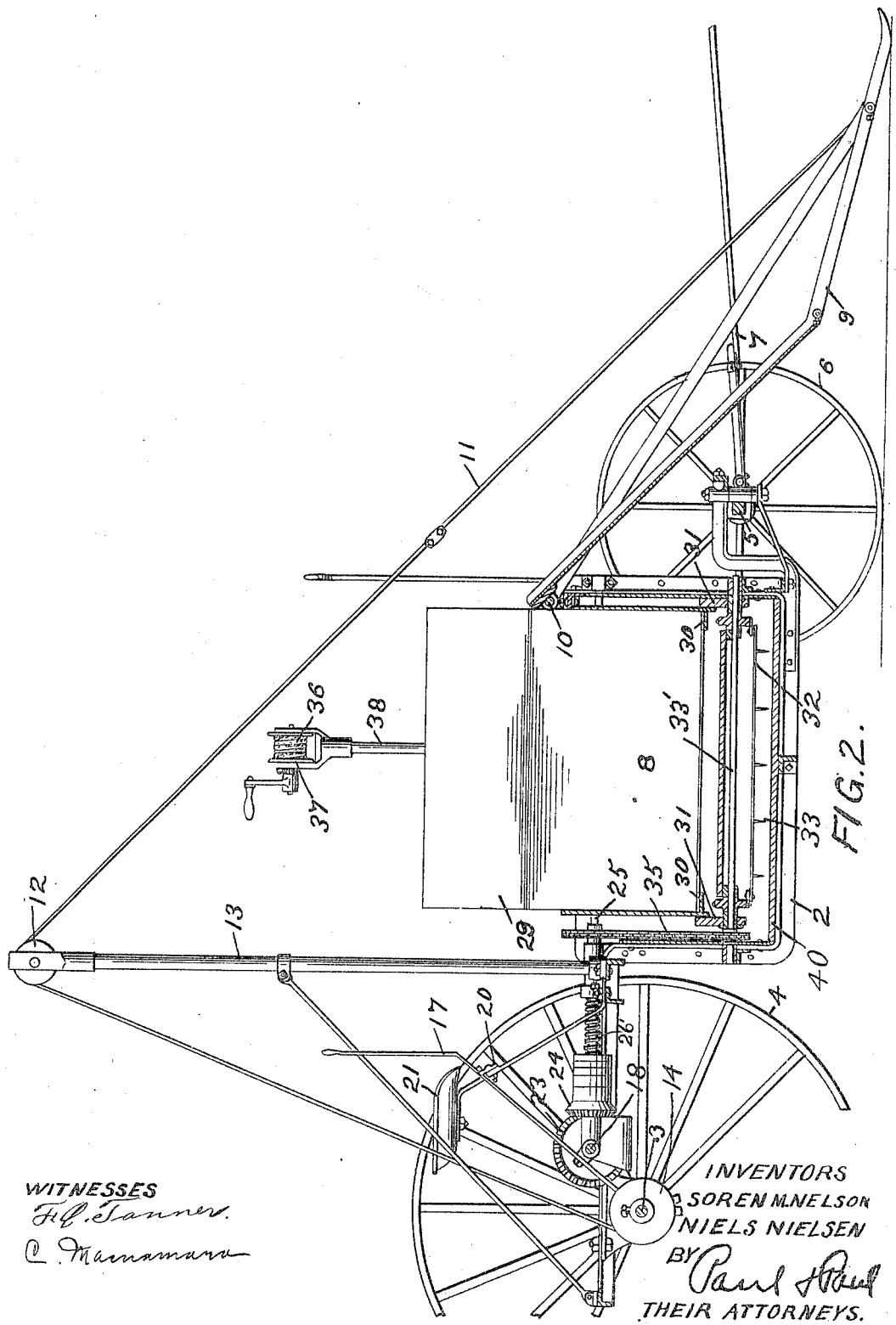
Figure 3:
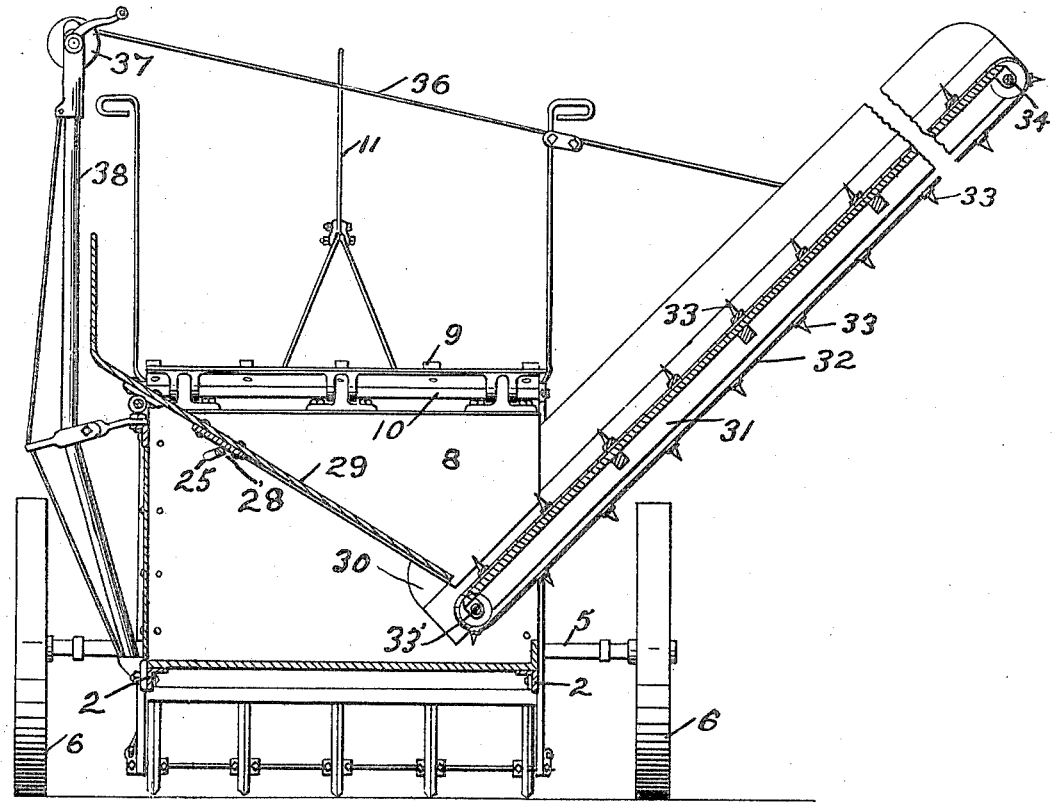
Figure 4:
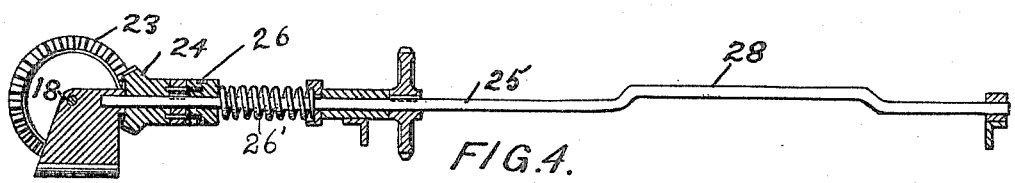
Figure 5:
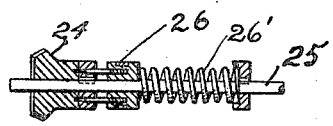

In the accompanying drawings, forming part of this specification, Figure 1 is a plan view of a shock-loading machine embodying our invention. Fig. 2 is a longitudinal vertical section of the same. Fig. 3 is a transverse sectional view. Figs. 4 and 5 are details of the clutch mechanism by means of which the operation of the machine is controlled.

In the drawings, 2 represents an angle-bar frame having a rear axle 3 and wheels 4 and forward axle 5 and wheels 6, between which and the rear wheels the frame is bent downwardly to a point near the ground, as indicated in Fig. 2. The forward axle is provided with the usual draft-rigging 7, and in the rear of said axle within the depressed portion of the frame is a hopper 8. A fork 9 is hinged at 10 on the forward upper wall of said hopper, and the teeth of said fork extend down over the forward axle and rest upon the ground and slide thereon as the machine is drawn across the field and are adapted to gather up the bundles in a shock and deposit them in the hopper. The fork is raised when it is loaded by means of a cable 11, connected at one end to the fork-tines and passing over a sheave 12 on a standard 13 and secured to a drum 14 on the axle 3. This drum is normally loose on the axle, but may be temporarily locked thereon by means of a clutch device 15, actuated by a spring 16, and controlled by an arm 17, that is slidably mounted on a shaft 18 and is held in its different positions by engagement with notches 19 in a bar 20.

A seat 21 is mounted on the frame of the machine within convenient reach of the arm 17 to enable the operator to throw the clutch, start the drum, and swing the fork on its pivots to a position where the bundles thereon will be discharged back into the hopper in the rear of the fork. When this has been done, the operator will disengage the clutch from the drum and allow the fork to drop back by gravity on the ground in position to gather up another shock.

The shaft 18 is driven through gears 21' and 22 from the axle 3. A gear 23 is secured on the shaft 18 and meshes with a similar gear 24 on a shaft 25, that is arranged lengthwise of the machine and is provided with a clutch mechanism similar to the one described, by means of which the operator can lock the gear 24 on its shaft or allow it to run loose thereon. An arm 26 is preferably provided in connection with said clutch, and an eccentric device 27, mounted on the frame of the machine, permits the operator to lock the clutch in its inoperative position and arrest movement of the shaft 25. This eccentric device consists of a disk eccentrically mounted on the machine-frame and adapted to be revolved and engage the arm 26 to separate the clutch members against the tension of the spring 26'. The shaft 25 is provided with an offset portion 28, over which a hinged plate 29 is arranged. This plate is arranged at an incline in the hopper, as shown in Fig. 3, with its hinge located at the top of one of the side walls, and its lower edge rests upon stops 30, provided near the opposite side of the hopper. The offset portion of the shaft 25 is located beneath said plate, and with each revolution of the said shaft the offset portion engages the said pivoted plate and imparts a slight vertical movement thereto to prevent the bundles or shocks from lodging thereon. A carrier-frame 31 is hinged at the lower end of the plate 29 and provided with a carrier-belt 32, having teeth 33, that engage the bundles or shocks and move them out of the hopper. The carrier-belt is mounted on shafts 33' and 34, the former of which is driven by a chain 35 from the shaft 25. A cable 36 is connected with the outer end of the carrier-frame and leads to a windlass 37, supported by a standard 38 on the side of the machine opposite from the carrier. By means of this windlass that carrier-frame can be raised or lowered to adjust it to the height of the wagon into which the bundles or shocks are to be loaded.

The operation of the machine is as follows: As the fork approaches each shock it will gather up the bundles, and as fast as the fork is full the operator will set the mechanism in motion to raise it and dump the bundles into the hopper. The bundles falling upon the pivoted plate will be jarred sufficiently to prevent their lodging thereon and will slide down to a point where they will be engaged by the teeth of the carrier and moved out of the hopper. The upper end of the carrier will be suspended over a wagon-box or other receptacle, into which the shocks will be discharged from the carrier. As soon as one shock is picked up and thrown into the hopper the fork will be dropped back upon the ground and repeat the operation.

We prefer to provide a removable plate 40 in the bottom of the hopper whereon the loose grain shaken out of the bundles when thrown into the hopper will fall and be preserved. The wagon into which the bundles are loaded is not shown in the drawings, but will be drawn along beneath the discharge end of the carrier and when filled will be taken to the stack or other place of deposit.

We claim as our invention—

1. The combination, with a wheeled frame provided with a hopper, of a fork pivotally supported on said frame and having teeth or tines adapted to rest and slide upon the ground and pick up the shocks of grain or corn thereon, and mechanism within control of the operator for lifting said pivoted fork to discharge the shock gathered up thereby into said hopper.

2. The combination, with a wheeled frame provided with a hopper or receptacle, of a fork pivoted on said frame near said hopper and having teeth or tines adapted to rest and slide upon the ground and pick up the bundles or shocks of grain or corn thereon, mechanism within control of the operator for lifting said fork to discharge the shock into said hopper, and a carrier arranged to gather up the bundles in said hopper and deliver them at the side of the machine, substantially as described.

3. The combination, with a wheeled frame provided with a hopper, of a pivoted fork adapted to rest and slide upon the ground, an inclined plate arranged in said hopper and whereon the bundles of grain are discharged from said fork, mechanism for tilting said fork, and a carrier arranged to receive the bundles from said plate.

4. The combination, with a wheeled frame having a shock-receptacle, of a fork pivoted on said frame and having teeth to rest and slide upon the ground, a hinged plate arranged in said hopper, means for imparting a jarring or jolting movement to said plate, and a transversely-operating carrier arranged to receive the bundles from said plate, substantially as described.

5. The combination, with a wheeled frame having a hopper near its forward end, of a fork pivotally supported on the forward wall of said hopper and having teeth that rest and slide upon the ground, mechanism for raising said fork to allow the shocks gathered up thereby to be discharged into said hopper, an inclined plate provided in said hopper and whereon the bundles fall from said fork, means for imparting a jarring or jolting action to said plate, and a carrier pivotally supported at its lower end in said hopper and arranged to receive the bundles from said plate and deliver them at the side of the machine.

6. The combination, with a wheeled frame provided near its forward end with a transversely-arranged hopper, of a fork pivoted on the forward wall of said hopper and having teeth that rest and slide upon the ground, a drum loosely mounted on the rear axle, a standard mounted on said frame and having a pulley, a cable attached to said drum and passing over said pulley to said fork, and a clutch mechanism within control of the operator for temporarily locking said drum on said axle, and a carrier operating in the bottom of said hopper and arranged to receive the bundles of grain or corn and deliver them at the side of the machine.

7. The combination, with a wheeled frame and a hopper, of a tilting fork arranged in front of said hopper and having teeth adapted to pick up shocks of grain or corn, and mechanism for raising said fork to discharge the gathered shock into said hopper.

8. The combination, with a frame and hopper, of a tilting fork arranged to pick up shocks of grain or corn from the ground, mechanism for tilting said fork to raise a shock and discharge it into said hopper, and a carrier or elevator operating in connection with said hopper.

9. The combination, with a wheeled frame provided with a shock-receptacle, of a fork having teeth adapted to pick up shocks of grain or corn, a vibrating plate provided in said receptacle, and a carrier or elevator operating in connection with said receptacle.

10. The combination, with a wheeled frame provided with a hopper having a removable floor or plate, of a pivoted fork arranged to pick up shocks of grain or corn, means for tilting said fork to discharge its load into said hopper, and a carrier or elevator operating in said hopper.

11. The combination, with a wheeled frame having a drop portion near its forward end and a hopper carried thereby, the bottom of said hopper being below the rear of said frame, a fork hinged near the forward wall of said hopper and having teeth adapted to pick up shocks of grain or corn, a side-delivery elevator operating in said hopper, and means for tilting said fork.

12. The combination, with a frame, of a side-delivery carrier or elevator mounted thereon, a fork pivoted in front of said elevator and having teeth adapted to slide upon the ground and pick up shocks of grain or corn, a vibrating bundle-support provided near said elevator and mechanism for raising said fork to discharge its load upon said support, substantially as described.

13. The combination, with a frame, of a side-delivery elevator or carrier thereon, a fork hinged in front of said elevator and having teeth adapted to pick up shocks of grain or corn, an upright standard mounted on said frame in the rear of said elevator and provided at its upper end with an antifriction-wheel, a cable attached to said fork and passing over said wheel, and mechanism for winding up said cable to raise said fork.

14. The combination, with a wheeled frame and hopper, of a side-delivery carrier or elevator operating therein, a fork hinged near the forward wall of said hopper, mechanism for driving said carrier continuously from the wheel-axle, and mechanism for intermittently raising said fork to discharge its contents.

15. The combination, with a wheeled frame and a shock-receptacle, of a vibrating bundle-support provided in said receptacle, a carrier or elevator operating near said support, and means for delivering shocks of grain or corn to said support, substantially as described.

In witness whereof we have hereunto set our hands this 22d day of April, 1905.

SOREN M. NELSON.
NIELS NIELSEN.

Witnesses:
A. C. MILLER,
W. E. PEGG.